(12) United States Patent
Khvostichenko et al.

(10) Patent No.: US 9,740,362 B1
(45) Date of Patent: Aug. 22, 2017

(54) EVENT CHIPS IN CALENDAR

(71) Applicant: GOOGLE INC., Mountain View, CA (US)

(72) Inventors: Boris Khvostichenko, Zurich (CH); Daniel Michael Greenblatt, Zurich (CH); Jonathon Aroner, Zurich (CH)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 14/333,143

(22) Filed: Jul. 16, 2014

(51) Int. Cl.
*G06F 3/048* (2013.01)
*G06F 3/0481* (2013.01)
*G06F 3/0484* (2013.01)
*G06F 21/60* (2013.01)

(52) U.S. Cl.
CPC .......... *G06F 3/0481* (2013.01); *G06F 3/0484* (2013.01); *G06F 21/60* (2013.01)

(58) Field of Classification Search
CPC .... G06F 3/0481; G06F 3/0484; G06Q 10/109
See application file for complete search history.

(56) References Cited

U.S. PATENT DOCUMENTS

| | | | |
|---|---|---|---|
| 4,831,552 A * | 5/1989 | Scully | G06Q 10/109 345/1.1 |
| 6,266,295 B1 | 7/2001 | Parker et al. | |
| 6,466,236 B1 * | 10/2002 | Pivowar | G06F 15/0266 715/835 |
| 6,785,868 B1 * | 8/2004 | Raff | G06Q 10/109 707/999.01 |
| 6,879,997 B1 * | 4/2005 | Ketola | H04W 4/12 455/517 |
| 7,349,920 B1 * | 3/2008 | Feinberg | G06Q 10/109 |
| 2003/0120717 A1 * | 6/2003 | Callaway | G06Q 10/06311 709/201 |
| 2004/0268270 A1 | 12/2004 | Hill et al. | |
| 2005/0039142 A1 * | 2/2005 | Jalon | G06Q 10/109 715/823 |
| 2006/0149609 A1 * | 7/2006 | Stenerson | G06Q 10/06 705/7.24 |
| 2006/0190313 A1 | 8/2006 | Lu | |
| 2007/0129986 A1 | 6/2007 | Barnett et al. | |
| 2007/0168892 A1 * | 7/2007 | Brush | G06Q 10/109 715/751 |
| 2008/0141142 A1 * | 6/2008 | Lyle | G06Q 10/109 715/751 |

(Continued)

FOREIGN PATENT DOCUMENTS

WO    WO 2014/067647 A1    5/2014

*Primary Examiner* — Dino Kujundzic
(74) *Attorney, Agent, or Firm* — Brake Hughes Bellermann LLP

(57) ABSTRACT

Provided are methods and systems for providing users with a simplified view of events shared across multiple calendars. An event associated with multiple calendars is displayed only once in a user's view of the multiple calendars, and is displayed together with a visual indication (an "event chip") that the event belongs to multiple calendars. The event chip displayed with a given event indicates, based on the patterns/colors/prints/etc. comprising the chip and/or the order of the patterns/colors/prints/etc. comprising the chip, which of the other calendars associated with the event is the lead calendar and which are secondary calendars, where the event chip represents the state of the event (e.g., accepted, declined, tentative, etc.) in the lead calendar.

15 Claims, 7 Drawing Sheets

(56) References Cited

U.S. PATENT DOCUMENTS

| | | | |
|---|---|---|---|
| 2008/0209344 A1* | 8/2008 | Knapp | G06Q 10/1095 715/751 |
| 2009/0083644 A1 | 3/2009 | Kimura | |
| 2010/0070894 A1* | 3/2010 | Krishnamurthy | G06F 3/0481 715/764 |
| 2010/0162105 A1* | 6/2010 | Beebe | G06Q 10/1093 715/273 |
| 2011/0086592 A1 | 4/2011 | Lee | |
| 2011/0154218 A1* | 6/2011 | Lee | G06Q 10/109 715/751 |
| 2011/0225015 A1 | 9/2011 | Spivack et al. | |
| 2011/0307816 A9 | 12/2011 | Barnett et al. | |
| 2011/0317523 A1 | 12/2011 | Lance et al. | |
| 2012/0204123 A1* | 8/2012 | Bauer | G06Q 10/109 715/772 |
| 2012/0287114 A1 | 11/2012 | Hallock et al. | |
| 2012/0320716 A1 | 12/2012 | DiMaggio et al. | |
| 2013/0036369 A1* | 2/2013 | Mitchell | G06Q 50/00 715/753 |
| 2015/0046209 A1* | 2/2015 | Choe | G06Q 10/1095 705/7.19 |
| 2015/0161569 A1* | 6/2015 | Shoham | G06Q 10/1093 705/7.18 |

\* cited by examiner

September 2013

WEEK OF SEP 2-8

2
Mon

House Cleaning
9:00am – 11:00am

House Cleaning
9:00am – 11:00am

WEEK OF SEP 9-15

WEEK OF SEP 16-22

16
Mon

House Cleaning
9:00am – 11:00am

House Cleaning
9:00am – 11:00am (Prior Art)

FIG. 6

EVENT CHIPS IN CALENDAR

BACKGROUND

In existing calendar systems, one user (e.g., User "X") can display the calendars of other users (e.g., Users "Y" and "Z") together with his or her own calendar. If there is an event to which Users X, Y, and Z are all invited, the event is shown in each user's calendar and thus is shown three times in User X's "grid view" of the calendar. This greatly obstructs the grid view of the calendar since the same information is shown multiple times, and often hides important information about the event or other events. In the case where User X looks at an "agenda view" of the calendar (where events are simply listed based on their respective start date/time) instead of the grid view, User X will see the same event repeating three times, one below another.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing web application services to users. More specifically, aspects of the present disclosure relate to providing users with a simplified view of events shared across multiple calendars.

One embodiment of the present disclosure relates to a method for displaying a time-based event across a plurality of calendars associated with the time-based event, the method comprising: determining that a time-based event is associated with a plurality of calendars being viewed together by a user; selecting a lead calendar from the plurality of calendars; generating an event chip for the time-based event based on data associated with the lead calendar; and displaying the event chip in the plurality of calendars being viewed together by the user, wherein the event chip includes an indication that the time-based event is associated with the plurality of calendars and also an indication of a state of the time-based event in the lead calendar.

In another embodiment, the method for displaying a time-based event further comprises, in response to detecting user interaction with the event chip, displaying additional data about the time-based event in the lead calendar.

In another embodiment, the method for displaying a time-based event further comprises, in response to detecting user interaction with the event chip, expanding the event chip into a plurality of different chips correspond to the plurality of calendars associated with the time-based event.

In yet another embodiment, selecting the lead calendar in the method for displaying a time-based event includes determining that one of the plurality of calendars associated with the time-based event is a primary calendar specific to the user, and selecting the primary calendar as the lead calendar.

In still another embodiment, selecting the lead calendar in the method for displaying a time-based event includes: determining that none of the plurality of calendars associated with the time-based event is a primary calendar specific to the user; in response to determining that the user has edit rights for one calendar of the plurality of calendars associated with the time-based event, selecting the one calendar as the lead calendar; in response to determining that the user has edit rights for two or more calendars of the plurality of calendars associated with the time-based event, selecting a lead calendar from the two or more calendars according to a calendar type of each of the two or more calendars and a name associated with each of the two or more calendars; and, in response to determining that the user has edit rights for none of the plurality of calendars associated with the time-based event, selecting a lead calendar from the plurality of calendars according to a calendar type of each of the plurality of calendars and a name associated with each of the plurality of calendars, wherein the calendar type is one of a calendar associated with a specific user and a calendar associated with a non-specific user or a group of users.

Another embodiment of the present disclosure relates to a system for displaying a time-based event across a plurality of calendars associated with the time-based event, the system comprising one or more processors and a non-transitory computer-readable medium coupled to the one or more processors having instructions stored thereon that, when executed by the one or more processors, cause the one or more processors to perform operations comprising: determining that a time-based event is associated with a plurality of calendars being viewed together by a user; selecting a lead calendar from the plurality of calendars; generating an event chip for the time-based event based on data associated with the lead calendar; and displaying the event chip in the plurality of calendars being viewed together by the user, wherein the event chip includes an indication that the time-based event is associated with the plurality of calendars and also an indication of a state of the time-based in the lead calendar.

In another embodiment, the one or more processors of the system for displaying a time-based event are caused to perform further operations comprising, in response to detecting user interaction with the event chip, displaying additional data about the time-based event in the lead calendar.

In another embodiment, the one or more processors of the system for displaying a time-based event are caused to perform further operations comprising, in response to detecting user interaction with the event chip, expanding the event chip into a plurality of different chips correspond to the plurality of calendars associated with the time-based event.

In yet another embodiment, the one or more processors of the system for displaying a time-based event are caused to perform further operations comprising: determining that one of the plurality of calendars associated with the time-based event is a primary calendar specific to the user; and selecting the primary calendar as the lead calendar.

In still another embodiment, the one or more processors of the system for displaying a time-based event are caused to perform further operations comprising: determining that none of the plurality of calendars associated with the time-based event is a primary calendar specific to the user; in response to determining that the user has edit rights for one calendar of the plurality of calendars associated with the time-based event, selecting the one calendar as the lead calendar; in response to determining that the user has edit rights for two or more calendars of the plurality of calendars associated with the time-based event, selecting a lead calendar from the two or more calendars according to a calendar type of each of the two or more calendars and a name associated with each of the two or more calendars;

and, in response to determining that the user has edit rights for none of the plurality of calendars associated with the time-based event, selecting a lead calendar from the plurality of calendars according to a calendar type of each of the plurality of calendars and a name associated with each of the plurality of calendars, wherein the calendar type is one of a calendar associated with a specific user and a calendar associated with a non-specific user or a group of users.

Yet another embodiment of the present disclosure relates to one or more non-transitory computer readable media storing computer-executable instructions that, when executed by one or more processors, causes the one or more processors to perform operations comprising: determining that a time-based event is associated with a plurality of calendars being viewed together by a user; selecting a lead calendar from the plurality of calendars; generating an event chip for the time-based event based on data associated with the lead calendar; and displaying the event chip in the plurality of calendars being viewed together by the user, wherein the event chip includes an indication that the time-based event is associated with the plurality of calendars and also an indication of a state of the time-based in the lead calendar, wherein the event chip includes a plurality of colors, each of the plurality of colors corresponding to a different one of the plurality of calendars associated with the time-based event.

In one or more other embodiments, the methods and systems described herein may optionally include one or more of the following additional features: the event chip includes a plurality of colors, each of the plurality of colors corresponding to a different one of the plurality of calendars associated with the time-based event; the event chip is displayed in the plurality of calendars as a single chip; the event chip includes a first color corresponding to the lead calendar and one or more other colors corresponding to one or more other calendars of the plurality of calendars, the first color being different from the one or more other colors; the data associated with the lead calendar includes data about a state of the time-based event in the lead calendar; and/or the lead calendar corresponds to a primary calendar associated with only the user.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 6 is a user interface screen illustrating an example of displaying a shared event in a calendar view under one or more existing approaches.

Figure 1:
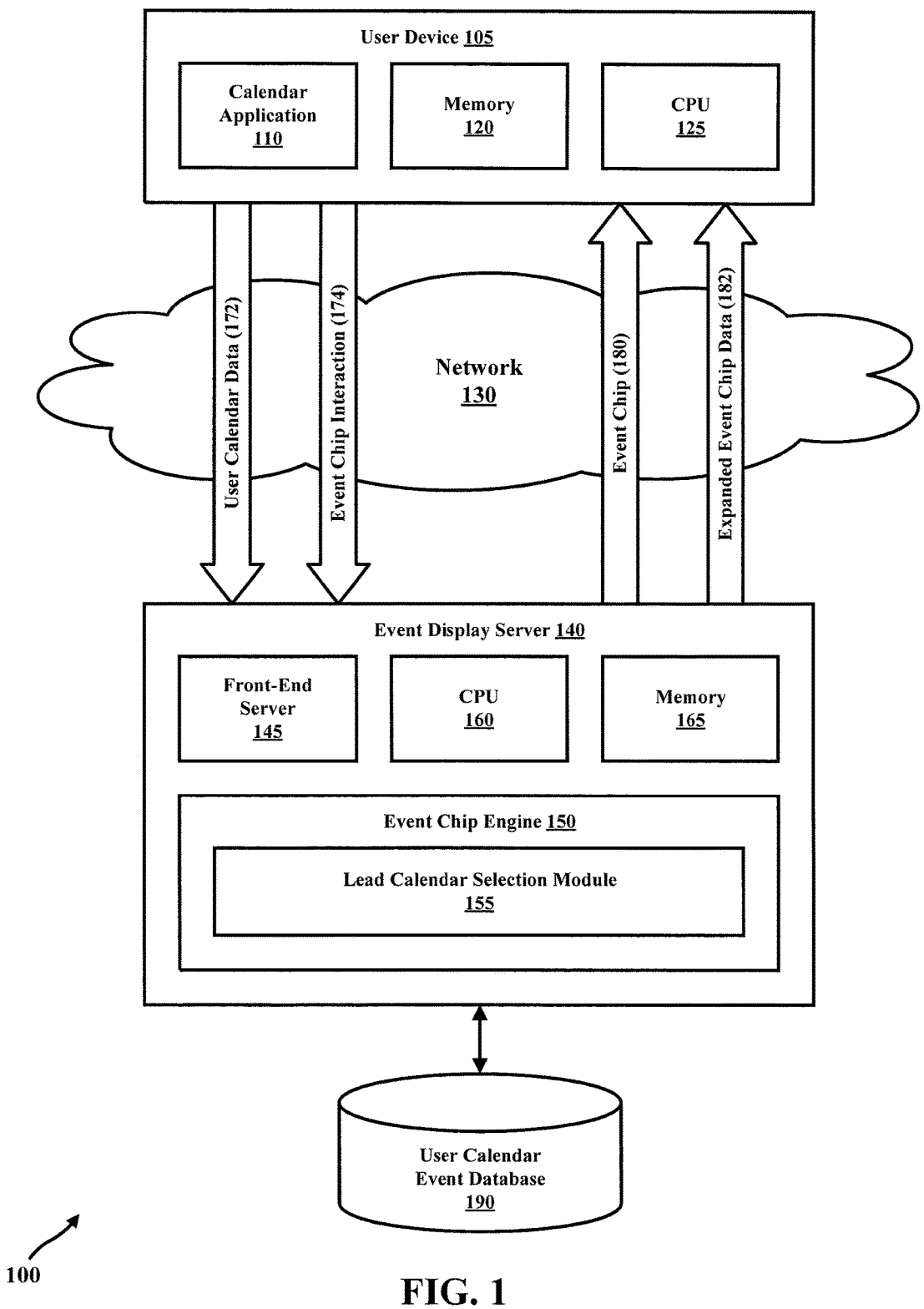
FIG. 1 is a block diagram illustrating an example system for displaying shared events across multiple calendars being viewed by a user according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

When using a calendar application, a user may display multiple calendars in the same view. For example, suppose an event scheduled in a first user's calendar involves one or more other users, and thus is shared across one or more other calendars associated with these other users. Under existing approaches for displaying multiple calendars in the same view, the event will appear multiple times in the first user's view, once for each of the calendars in which the event is scheduled (e.g., once for each of the other users who have been invited to the event and who have a shared calendar with the first user). However, to simplify the view of the first user (e.g., the user interface of the calendar application displayed to the first user), the methods and systems of the present disclosure display the event only once in the user's view of the multiple calendars and use what is referred to herein as an "event chip" (which may also sometimes be referred to herein simply as a "chip" for brevity) to indicate that the event is shared across (e.g., is scheduled in or belongs to) one or more of these multiple calendars and/or other calendars not being viewed.

For example, assume User A has access to User B's calendar and displays both User A's and User B's calendars at the same time. User A creates an event and invites User B to it. In at least one existing approach, User A would see two separate occurrences of the event, each with a different color. One color would be for User A's calendar and the second color would be for User B's calendar. FIG. 6 shows an example of how a shared event might appear in a calendar view under such an existing approach. However, the methods and systems of the present disclosure change this behavior under existing approaches and instead show a single chip for such an event, where the single chip includes an indication that the particular event is shared across both User A's calendar and User B's calendar.

As will be described in greater detail below, embodiments of the present disclosure relate to displaying an event shared across multiple calendars (which may or may not be associated with multiple different users) only once in a user's view of the multiple calendars, where the event is displayed together with a visual indication (an "event chip") that the event belongs to multiple calendars. For example, an event chip displayed with a given event may indicate, based on the colors comprising the chip and/or the order of the colors comprising the chip, that the event is shared across User A's calendar, User B's calendar, and Calendar "XYZ".

Among numerous other advantages, the methods and systems of the present disclosure provide users with a simplified view (e.g., user interface) of their respective calendars by limiting the initial display or availability of information not particularly relevant for events shared across one or more other calendars, thereby allowing for the display of more useful information about the events (e.g., title, location, start/end time(s), etc.).

In accordance with at least one embodiment described herein, an event chip displayed with an event may be associated with one lead calendar and one or more secondary calendars, where the event chip represents the state of the event (e.g., accepted, declined, tentative, etc.) in the lead calendar.

As used herein, "primary calendar" refers to a calendar associated with a particular user or particular e-mail address (e.g., associated with a user account), while "secondary calendar" refers to a calendar not associated with any particular one user or not associated with any one user account e-mail address. For example, a secondary calendar may be associated with a group of users (e.g., a "team" calendar). For example, in addition to their primary calendar, a user may create one or more other calendars not associated with any particular e-mail address or user account, where these other calendars may be considered secondary calendars of the user. In the context of selecting a lead calendar for an event chip, in accordance with one or more embodiments described herein, the primary calendars of different users may be collectively referred to as "people calendars."

A shared event may be in different states across different calendars. For example, Guest "X" may have declined the event, Guest "Y" may have accepted the event, Guest "Z" may not have responded to the event, and the like. To reduce the amount of space needed to display a shared event in a user's view of multiple calendars, in accordance with one or more embodiments described herein, a "lead" calendar may be selected for an event chip and data from the lead calendar may be used to determine what to display in the main body of the chip. Further details about the process of selecting a lead calendar for an event chip are provided below.

The color scheme utilized with event chips may be persistent. For example, the lead (or primary) color of the chip (associated with the lead calendar) and the order of the secondary colors (associated with secondary calendars) also comprising the chip may be the same for different events shared across the same calendars. For example, if Event "A" is shared across three calendars that a user is viewing and Event "B" (which is different event from Event "A") is also shared across the same three calendars, then the primary color and the order of secondary colors of the respective event chips for each of the events may be the same.

In accordance with one or more embodiments of the present disclosure, if an event is shared across more calendars than the calendars being viewed by a user, the event may be displayed with a primary chip color and an indication that the event is shared across at least one calendar not being viewed by the user. For example, different colors may be shown for up to three calendars simultaneously being viewed by the user. If an event is shared across more than the three calendars being viewed by the user, or an event is shared with at least one calendar not being viewed by the user, than an indication of such (e.g., an icon or symbol) may be displayed with the event.

As described above, an event chip may be associated with a "lead" calendar in which a shared event is scheduled (e.g., belongs to). When an event chip is associated with a lead calendar, the chip shows the state of the shared event in the lead calendar (e.g., the response to the invite for the event, if any, for the lead calendar) and also the color of the lead calendar (e.g., the primary color). It should be noted that, in accordance with one or more embodiments described herein, an event chip may have, in addition to or instead of a primary color, a map, an image, an avatar, etc.

An event that is scheduled in a user's calendar (e.g., an event that is accepted or tentatively accepted in a calendar web application utilized by the user) may include a variety of data associated with the event. For example, a calendar event may include data about intended start and/or end time(s) for the event, a location (e.g., a building or other type of venue) at which the event is to take place, a subject, title, or purpose of the event (e.g., what is involved in the event), identities of one or more users invited to attend the event, and the like. In accordance with one or more embodiments described herein, such event data may be accessed for a shared event by selecting (e.g., clicking on) the event chip displayed with the event.

If a user selects (e.g., clicks-on, interacts with, engages, etc.) an event chip associated with a shared event, the event may open in the lead calendar (e.g., the primary calendar associated with the shared event). In accordance with at least one embodiment, if a user selects or clicks-on on the visual indicator component (e.g., the multi-colored or patterned portion) of an event chip associated with a shared event, the event chip may expand into a constellation of different chips (e.g., one chip per calendar associated with the shared event).

In describing various embodiments and features of the present disclosure, reference is sometimes made to data (e.g., calendar data, event data, etc.) "received from a user" and indications (e.g., event chips) "provided to a user." It should be understood that in the implementation context, data and/or indications "received from a user" or "provided to a user" means data and/or indications received from/provided to a device of a user (a "user device"), the device being configured for operation or use by the user. As such, "data received from a user" and "data received from a user device", as well as "indications provided to a user" and "indications provided to a user device", may be used interchangeably at times for purposes of simplicity.

Additionally, one or more examples provided herein describe displaying, to a user viewing multiple calendars, an event chip in conjunction with an event scheduled across some or all of the multiple calendars. It should be understood that the term "event chip" is not in any way intended to limit the scope of the present disclosure. Rather, this term is used herein to describe an example appearance of the visual indicator that may be displayed with shared calendar events in accordance with one or more embodiments of the present disclosure. It should also be understood that, in accordance with one or more embodiments described herein, a calendar event associated with a user may be any time-based event associated with the user, and is not limited to an event scheduled only in a user's calendar application. For example, event chips may be displayed in conjunction with tasks assigned to a user as well as one or more other users.

FIG. 1 is an example system 100 and surrounding environment for displaying time-based events shared across multiple calendars being viewed by a user, where the time-based events are displayed using an event chip. Event Display Server 140 may include Front-End Server 145, CPU 160, Memory 165, and Event Chip Engine 150, while User Device 105 may include Calendar Application 110, Memory 120, and CPU 125. Event Display Server 140 may also include or have access to User Calendar Event Database 190. Additional details about various components of Event Display Server 140 and User Device 105, as well as details about example interactions between such components, will be provided below.

It should be understood that, in accordance with one or more embodiments described herein, any one or more of the components comprising Event Display Server 140 may be a part of one or more other components and/or systems separate from Event Display Server 140. In addition, Event Display Server 140 may be one server in a collection of servers comprising system 100, or may itself be a component of a larger server within system 100.

In accordance with one or more embodiments of the present disclosure, Event Display Server 140 may be configured to communicate via a network 130 (e.g., the Internet) with User Device 105. For example, Event Display Server 140 and User Device 105 may communicate via network 130 to exchange a variety of different data and/or signals, such as, for example, user calendar data (172), event chip interaction data (174) (e.g., an indication of interaction with an event chip displayed in Calendar Application 110 installed on User Device 105), an event chip (180), and expanded event chip data (182) (e.g., additional data about a time-based event associated with an event chip).

The Event Chip Engine 150 may be configured to implement a Lead Calendar Selection Module 155 that selects, from among multiple calendars associated with a time-based event, a lead calendar for the event chip (180) provided to User Device 105 for display in one or more calendars being viewed in Calendar Application 110.

It should be understood that, in accordance with one or more of the embodiments described herein, data about a user's calendar (e.g., user calendar data (172)) and/or data about interaction with an event chip displayed in a calendar application of the user (e.g., event chip interaction data (174) for an event chip displayed in calendar application 110 installed on User Device 105) may be received (e.g., at Event Display Server 140) from any one or more of a variety of different types of User Devices 105 of the user (e.g., belonging to, authorized for use by, or otherwise associated with the user), and data comprising an event chip (e.g., event chip (180)) and/or additional data about a time-based event associated with an event chip (e.g., expanded event chip data (182)) may be provided (either together or separate from each other) to any one or more of the same or different such User Devices 105 for presentation to the user (e.g., for presentation on a display of any such devices). Some non-limiting examples of User Device 105 include laptop computers, tablet computing devices, mobile telephones, smartphones, wearable user computing devices (e.g., wristwatch or glasses configured as computing devices), as well as numerous other types or variations of such devices similar in nature and/or functionality.

Figure 2:
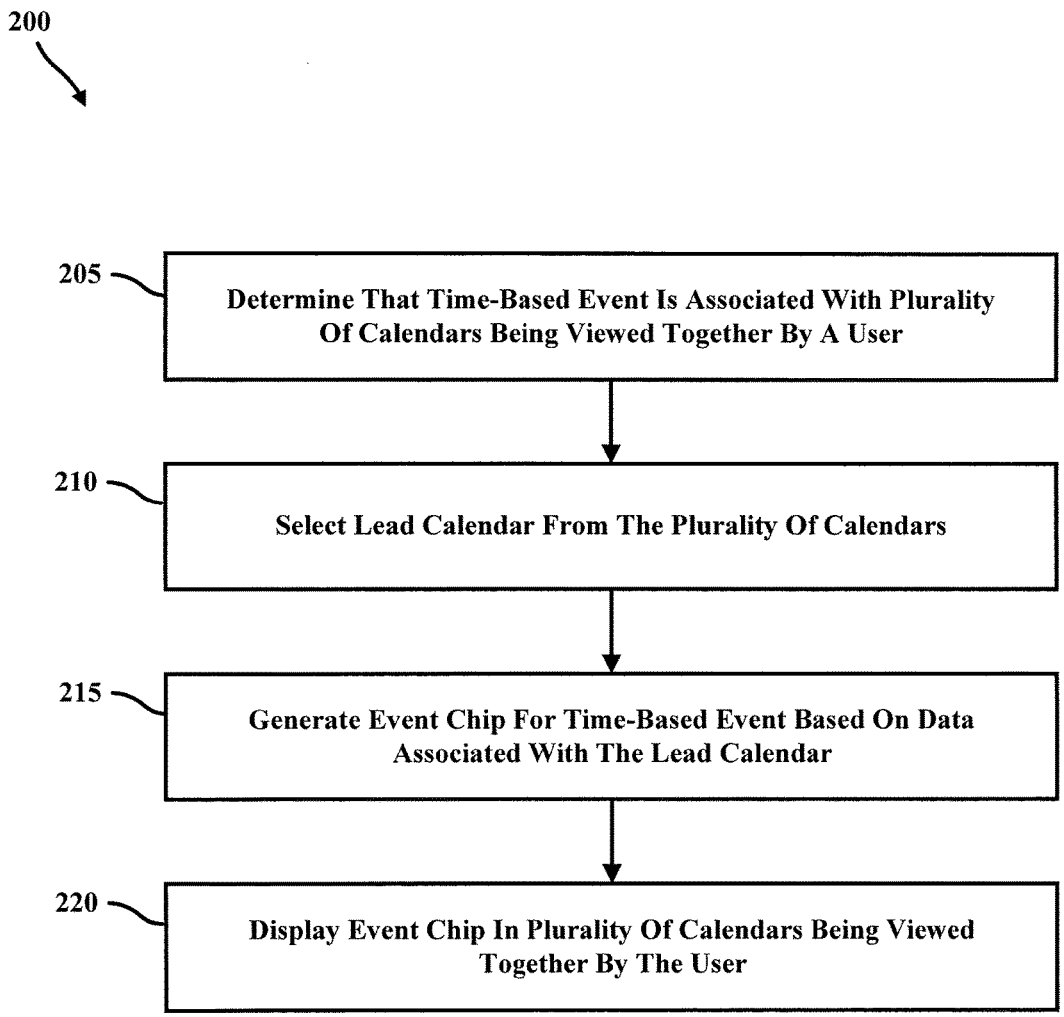
FIG. 2 is a flowchart illustrating an example method for displaying an event shared across multiple calendars being viewed by a user by using a single event chip representative of the event in a lead calendar according to one or more embodiments described herein.

FIG. 2 is an example process 200 for displaying a time-based event across multiple calendars associated with the event and being viewed by a user, using a single event chip in which the event chip is indicative of a state of the event in a lead calendar associated with the event. In accordance with one or more embodiments described herein, the example process 200 for displaying a time-based event may be performed by a server configured for or dedicated to performing such a process (e.g., Event Display Server 140 in the example system 100 shown in FIG. 1).

At block 205, a determination may be made that a time-based event is associated with multiple calendars being viewed together by a user. For example, it may be determined at block 205 that a calendar event is associated with (e.g., scheduled in, accepted/tentatively accepted/declined in, sent as an invite to, etc.) more than one (e.g., two or three) calendar that is simultaneously being viewed by a user.

At block 210, a lead calendar may be selected (e.g., determined, identified, etc.) from the multiple calendars associated with the time-based event. In accordance with one or more embodiments described herein, the selection of the lead calendar at block 210 may be performed in a manner similar to the lead calendar selection process illustrated in FIG. 3 and described in detail below. Also, it should be understood that a time-based event may be associated with one or more calendars other than the calendars being viewed by the user. As further described below with reference to the example lead calendar selection process shown in FIG. 3, the selection of the lead calendar at block 210 may be based on the particular user's relationship and/or association with each of the calendars being viewed simultaneously by the user (as determined at block 205).

At block 215, an event chip may be generated for the time-based event based on data associated with the lead calendar selected at block 210. For example, in accordance with one or more embodiments, an event that is scheduled in a user's calendar may include a variety of data associated with the event. For example, the calendar event may include data about intended start and/or end time(s) for the event, a location (e.g., a building or other type of venue) at which the event is to take place, a subject, title, or purpose of the event (e.g., what is involved in the event), identities of one or more users invited to attend the event, and the like. In addition, the event may include data about a state of the event in the particular calendar. For example, the event may include data indicating whether the event has been accepted, declined, or tentatively accepted in the particular calendar, or whether the event has not been responded to for the calendar in which it is present.

The event chip that may be generated at block 215 may include multiple different colors/prints/patterns/etc., where each of the different colors/prints/patterns/etc. corresponds to a different one of the calendars associated with the time-based event. For example, in accordance with one or more embodiments described herein, the event chip that may be generated at block 215 may include a first color corresponding to the lead calendar (e.g., selected at block 210) and one or more other colors corresponding to one or more other calendars of the plurality of calendars, where the first color is different from the one or more other colors.

At block 220, the event chip generated at block 215 may be displayed in the multiple calendars being viewed together by the user. In accordance with at least one embodiment described herein, the event chip displayed at block 220 may include an indication that the time-based event is associated with multiple calendars and also an indication of a state of the time-based event in the lead calendar selected at block 210. For example, FIGS. 4 and 5, which will be described in greater detail below, are user interfaces (400, 500) illustrating examples of event chips (410 and 540, respectively) displayed in multiple calendars being viewed together by a user. It should also be noted that, in accordance with at least one embodiment, the event chip that may be displayed in the plurality of calendars at block 220 may be displayed in the calendars as a single chip.

Figure 3:
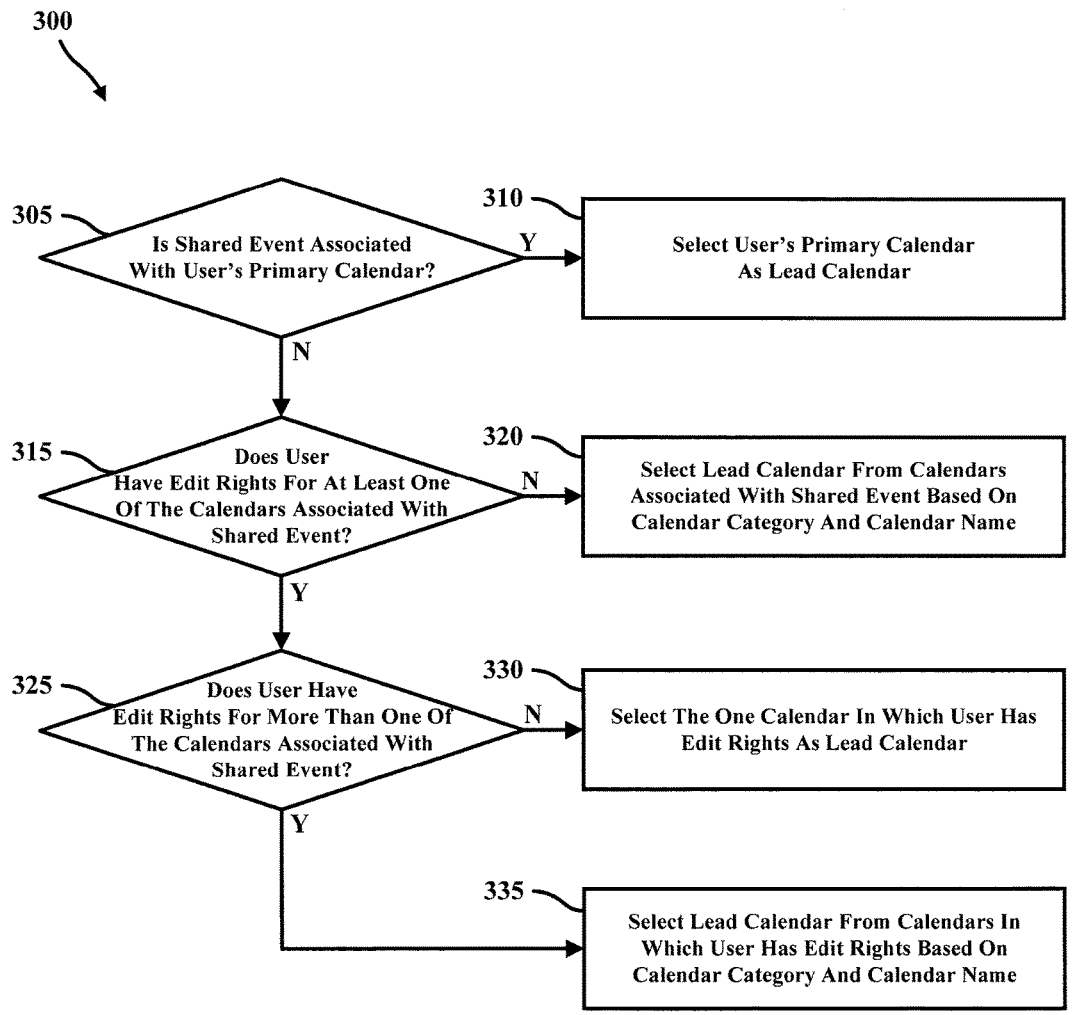
FIG. 3 is a flowchart illustrating an example method for selecting a lead calendar for an event chip according to one or more embodiments described herein.

FIG. 3 illustrates an example process 300 for selecting a lead calendar for an event chip associated with an event shared across multiple calendars. In accordance with at least one embodiment described herein, the selection of a lead calendar for an event chip may be based on one or more characteristics of the calendars with which a shared event is associated, one or more characteristics of any users associated with the calendars, or any combination thereof. Such characteristics may include, for example, whether a calendar is a primary calendar or a secondary calendar, whether a user associated with a given calendar has edit rights with respect to the calendar, the names (e.g., user names, group/team names, etc.) associated with each of the calendars, as well as a variety of other characteristics in addition to or instead of the example characteristics described above. Further, in accordance with at least one embodiment described herein, the example process 300 for selecting a lead calendar may be performed by a lead calendar selection module such as, for example, Lead Calendar Selection Module 155 of Event Chip Engine 150 in the example system 100 described above and illustrated in FIG. 1.

In accordance with one or more embodiments of the present disclosure, the example process 300 for selecting a lead calendar may be performed in a manner similar to the selection of a lead calendar at block 210 in the example process 200 described above and illustrated in FIG. 2. For example, the operations provided at blocks 305 through 335 in the example process 300 may be performed for a time-based event (e.g., a calendar event, task, etc.) associated with (e.g., shared across) multiple calendars being viewed together by a user.

At block 305, it may be determined whether the shared event is associated with the user's primary calendar. A shared event may be associated with the user's primary calendar where, for example, the user is the organizer/initiator of the event, or where the user is a guest invited to the event. If it is determined at block 305 that the shared event is associated with the user's primary calendar, then at block 310 the user's primary calendar may be selected as the lead calendar for an event chip generated for the event (e.g., event chip (180) generated by Event Display Server 140 and provided to User Device 105 in the example system 100 shown in FIG. 1).

On the other hand, if it is determined at block 305 that the shared event is not associated with the user's primary calendar, then at block 315 a determination may be made as to whether the user has edit rights for at least one of the calendars associated with the shared event. For example, a user may have edit rights for a calendar where the user has been granted permission or access to edit various data associated with time-based events scheduled in the particular calendar. For example, a user may have edit rights for a calendar where the user can indicate and/or change a state of (e.g., a response to) a time-based event in the calendar.

If it is determined at block 315 that the user does not have edit rights for at least one of the calendars associated with the shared event, then at block 320 a lead calendar for an event chip generated for the event may be selected from the calendars associated with the shared event based on a calendar type/category (e.g., primary calendar, secondary calendar, etc.) for each of the calendars, a name associated with each of the calendars, or some combination thereof. For example, in accordance with at least one embodiment, at block 320 the calendars associated with the shared event may be ordered (e.g., assigned priorities) according to calendar type/category (e.g., primary calendars ordered higher than secondary calendars), and then within each calendar type/category ordered alphabetically according to a name associated with each of the calendars. The calendar highest in the order (e.g., assigned the highest priority) may be selected as the lead calendar for the event chip generated for the event.

If at block 315 it is determined that the user does have edit rights for at least one of the calendars associated with the shared event, then at block 325 a determination may be made as to whether the user has edit rights for more than one of the calendars associated with the shared event.

If it is determined at block 325 that the user does not have edit rights for more than one of the calendars associated with the shared event (e.g., the user has edit rights for exactly one of the calendars associated with the shared event), then at block 330 the one calendar for which the user has edit rights may be selected as the lead calendar for the event chip generated for the event.

However, if it is determined at block 325 that the user does have edit rights for more than one of the calendars associated with the shared event (e.g., the user has edit rights for two or more of the calendars associated with the shared event), then at block 335 the lead calendar for the event chip generated for the event may be selected from among the two or more calendars associated with the shared event for which the user has edit rights. In accordance with at least one embodiment of the present disclosure, at block 325 the calendars associated with the shared event for which the user has edit rights may be ordered (e.g., assigned priorities) according to calendar type/category (e.g., primary calendars ordered higher than secondary calendars), and then within each calendar type/category ordered alphabetically according to a name associated with each of the calendars. The calendar highest in the order (e.g., assigned the highest priority) may be selected as the lead calendar for the event chip generated for the event.

As further described below, in accordance with one or more embodiments of the present disclosure, an event shared across multiple calendars may be displayed as an event chip or with an event chip.

Figure 4:
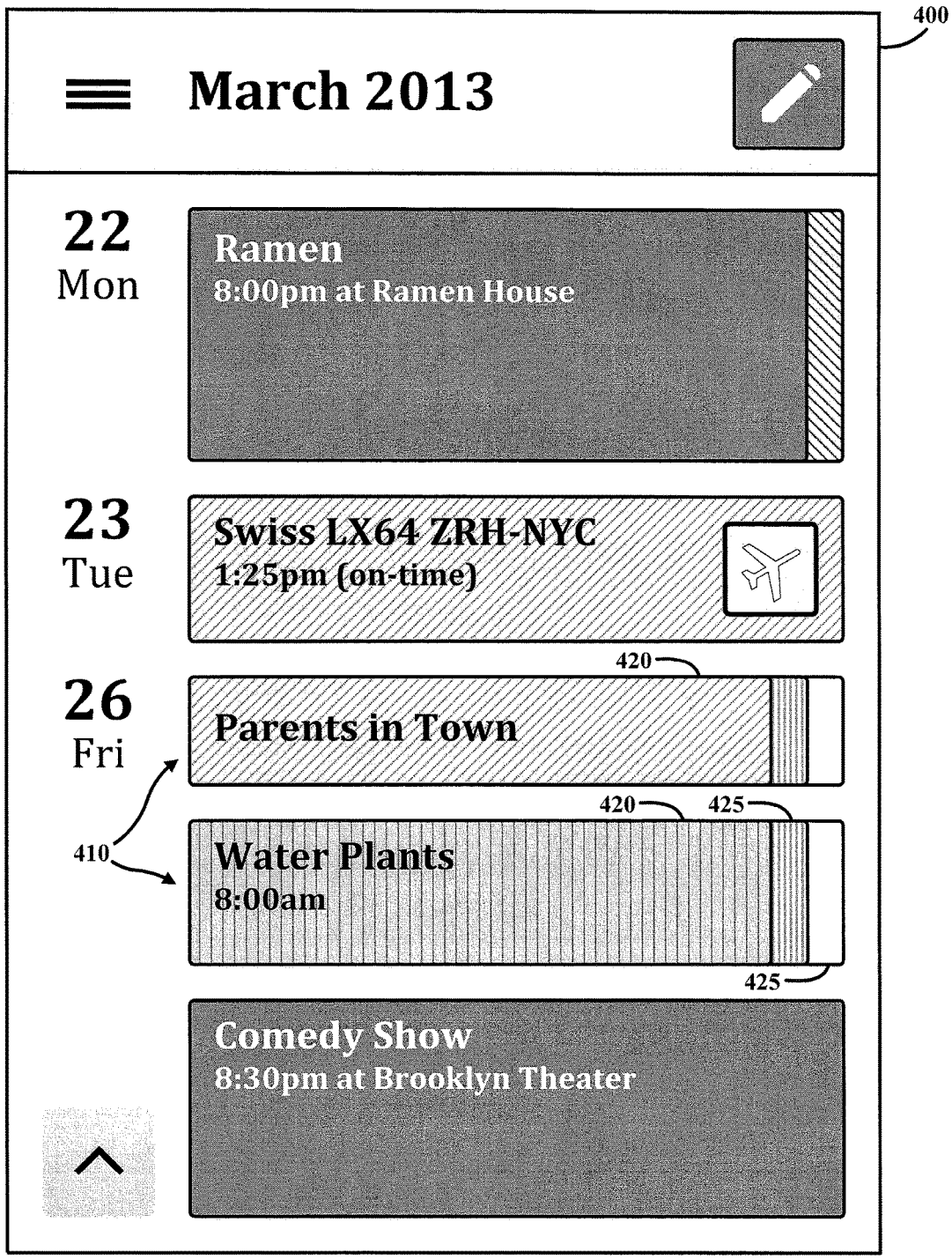
FIG. 4 is a user interface screen illustrating an example agenda view of multiple calendars, where events shared across some or all of the calendars are displayed as event chips according to one or more embodiments described herein.

For example, FIG. 4 illustrates an example agenda view 400 of multiple calendars, where events shared across some or all of these calendars are displayed as event chips 410 in that the actual events (e.g., "Parents in Town" and "Water Plants") are displayed in a primary pattern/color/print/etc. 420 (e.g., representative of the lead calendar associated with the event) with one or more secondary patterns/colors/prints/etc. 425 (e.g., representative of one or more secondary calendars associated with the event). In the example view 400, the shared event "Parents in Town" is displayed as an event chip 410 with a primary pattern 420 and two secondary patterns 425 different from the primary pattern 420 and from each other.

Figure 5:
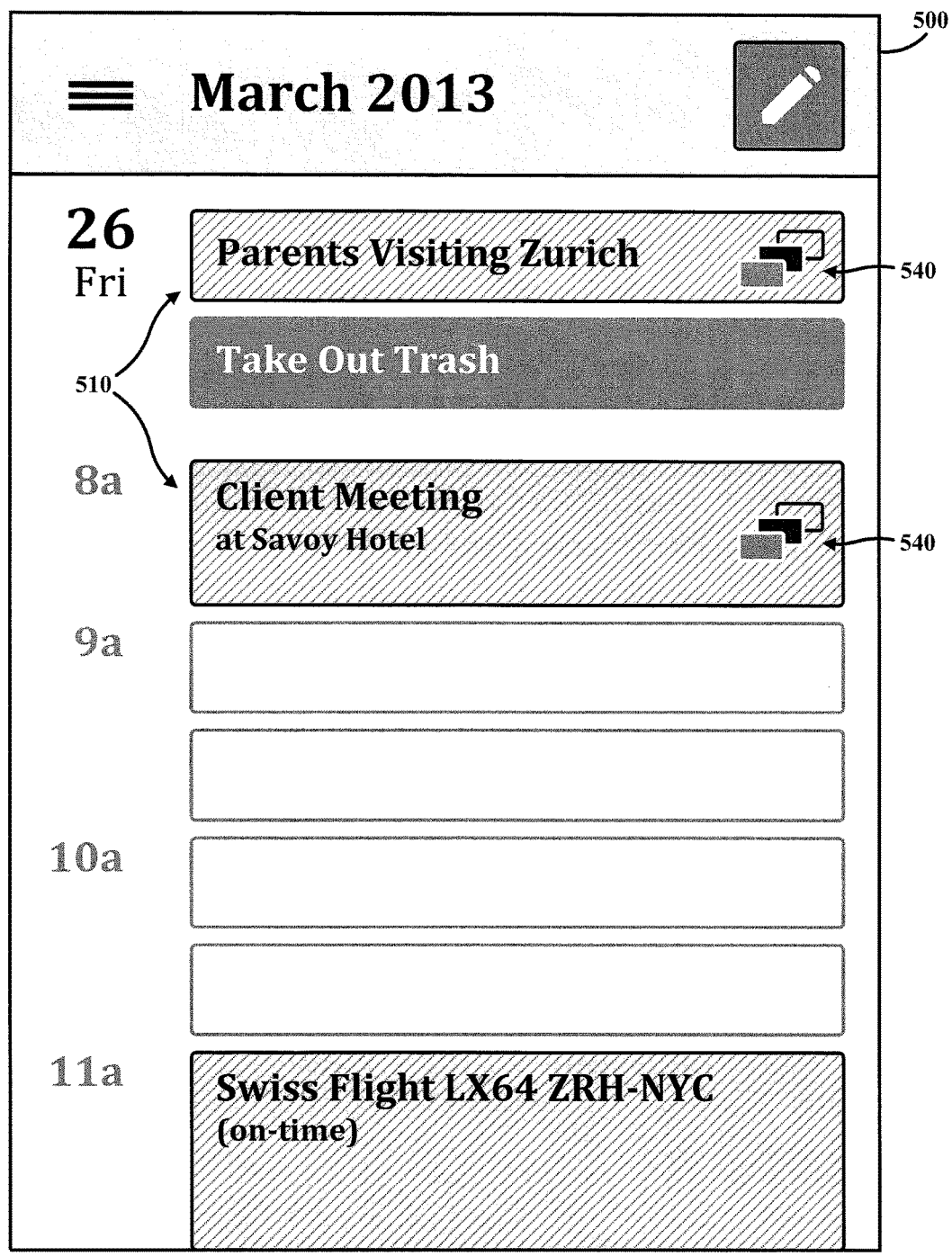
FIG. 5 is a user interface screen illustrating an example agenda view of multiple calendars, where events shared across some or all of the calendars are displayed in conjunction with event chips according to one or more embodiments described herein.

FIG. 5 illustrates an example agenda view 500 of multiple calendars, where events 510 shared across some or all of these calendars are displayed (in conjunction) with event chips 540. In accordance with at least one embodiment, the shared events 510 may be displayed with one or more event chips in the format of, for example, tiles 540, one of which may be in a primary pattern/color/print/etc. (e.g., representative of the lead calendar associated with the event) and the others of which may be in one or more secondary patterns/colors/prints/etc. (e.g., representative of one or more secondary calendars associated with the event). It should be noted that the event chips 540 displayed in conjunction with the shared events 510 may be in a variety of other shapes and/or sizes in addition to or instead of the tile-shape described above and shown in FIG. 5.

It should also be noted that, in accordance with one or more embodiments described herein, a user who is viewing multiple calendars simultaneously may be allowed to perform one or more actions in each of the calendars across which an event is shared. For example, in accordance with at least one embodiment, a calendar application may be configured to include an event edit mode that enables a user to edit the state of (e.g., the response to) an event associated with any of the calendars in which the event belongs. The even edit mode may also include switching functionality to allow a user to switch between the calendars being viewed (or between the calendars that are viewable) by the user.

Figure 7:
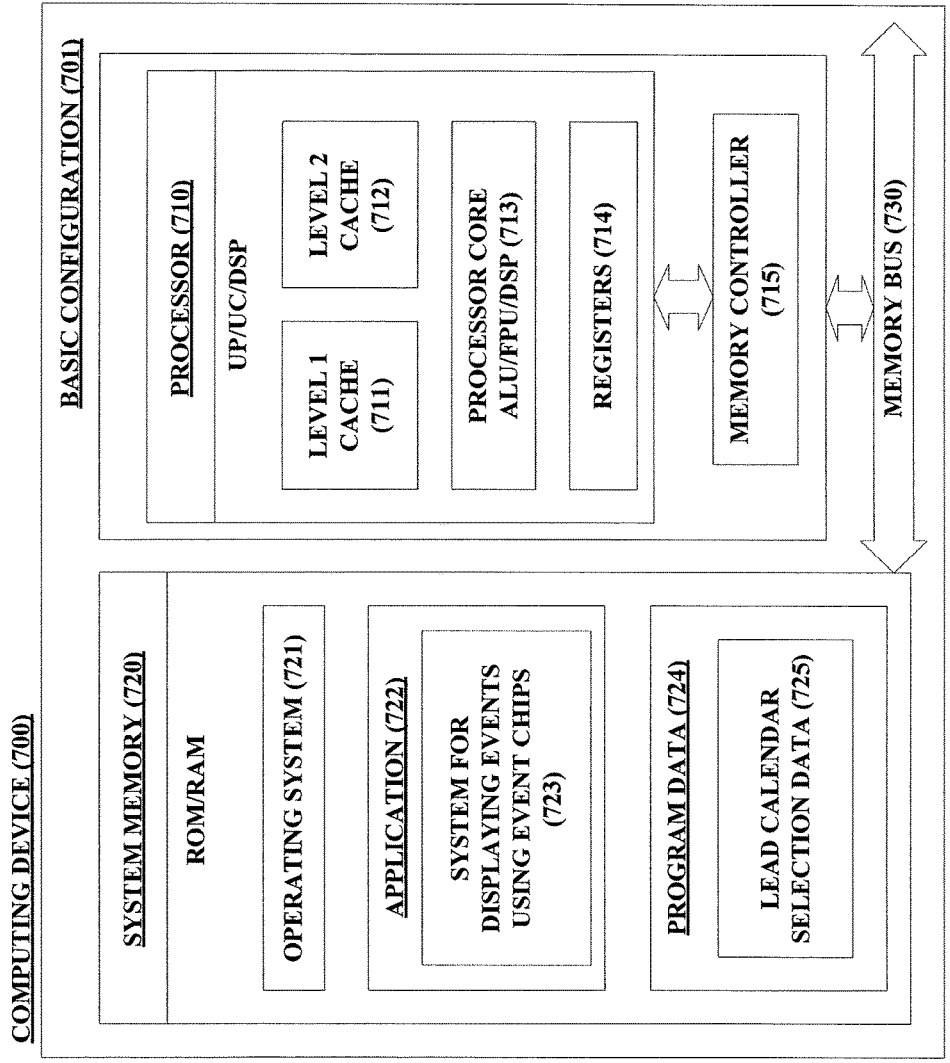
FIG. 7 is a block diagram illustrating an example computing device arranged for displaying an event shared across multiple calendars being viewed by a user using an event chip representative of a state of the event in a lead calendar according to one or more embodiments described herein.

FIG. 7 is a high-level block diagram of an exemplary computer (700) that is arranged for displaying a time-based event (e.g., calendar event, task, etc.) shared across multiple calendars only once in a user's view of the multiple calendars, where the event is displayed together with a visual indication (e.g., an "event chip") that the event is associated with multiple calendars, according to one or more embodiments described herein. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a system (e.g., system 100 as shown in the example of FIG. 1) for displaying events using event chips (723) to a user (e.g., to a user device) viewing multiple calendars associated with the events together according to one or more embodiments described herein. Program Data (724) may include storing instructions that, when executed by the one or more processing devices, implement a system and method for displaying events using event chips according to one or more embodiments described herein. Additionally, in accordance with at least one embodiment, program data (724) may include lead calendar selection data (725), which may relate to various characteristics of calendars associated with a shared event in order to determine a lead calendar for an event chip that may be generated for the event. In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for displaying a time-based event across a plurality of calendars associated with the time-based event, the method comprising:
   determining that the time-based event is associated with a plurality of calendars being viewed together by a user;
   selecting a lead calendar from the plurality of calendars associated with the time-based event based on a determination as to whether one of the plurality of calendars being viewed together by the user is a primary calendar specific to the user, where a primary calendar is a calendar associated with a particular user;
   generating an event chip for the time-based event based on data associated with the lead calendar; and
   displaying the event chip in the plurality of calendars being viewed together by the user, wherein the event chip includes an indication that the time-based event is associated with the plurality of calendars and also an indication of a state of the time-based event in the lead calendar, wherein
   the state of the time-based event identifies whether there has been a user response to the time-based event, and if so, an indication of the user's response, and
   selecting the lead calendar includes:
      determining that none of the plurality of calendars associated with the time-based event is a primary calendar specific to the user;
      responsive to determining that the user has edit rights for one calendar of the plurality of calendars associated with the time-based event, selecting the one calendar as the lead calendar;
      responsive to determining that the user has edit rights for two or more calendars of the plurality of calendars associated with the time-based event, selecting a lead calendar from the two or more calendars according to a calendar type of each of the two or more calendars and a name associated with each of the two or more calendars; and
      responsive to determining that the user has edit rights for none of the plurality of calendars associated with the time-based event, selecting a lead calendar from the plurality of calendars according to a calendar type of each of the plurality of calendars and a name associated with each of the plurality of calendars, where the calendar type is one of a calendar associated with a specific user and a calendar associated with a non-specific user or a group of users.

2. The method of claim 1, wherein the event chip includes a plurality of colors, each of the plurality of colors corresponding to a different one of the plurality of calendars associated with the time-based event.

3. The method of claim 1, wherein the event chip is displayed in the plurality of calendars as a single chip.

4. The method of claim 1, wherein the event chip includes a first color corresponding to the lead calendar and one or more other colors corresponding to one or more other calendars of the plurality of calendars, the first color being different from the one or more other colors.

5. The method of claim 1, further comprising:
   in response to detecting user interaction with the event chip, displaying additional data about the time-based event in the lead calendar.

6. The method of claim 1, further comprising:
   in response to detecting user interaction with the event chip, expanding the event chip into a plurality of different chips corresponding to the plurality of calendars associated with the time-based event.

7. The method of claim 1, wherein the data associated with the lead calendar includes data about a state of the time-based event in the lead calendar.

8. A system comprising:
   one or more processors; and
   a non-transitory computer-readable medium coupled to said one or more processors having instructions stored thereon that, when executed by said one or more processors, cause said one or more processors to perform operations comprising:
      determining that a time-based event is associated with a plurality of calendars being viewed together by a user;
      selecting a lead calendar from the plurality of calendars associated with the time-based event based on a determination as to whether one of the plurality of calendars being viewed together by the user is a primary calendar specific to the user, where a primary calendar is a calendar associated with a particular user;
      generating an event chip for the time-based event based on data associated with the lead calendar; and
      displaying the event chip in the plurality of calendars being viewed together by the user, wherein the event chip includes an indication that the time-based event is associated with the plurality of calendars and also an indication of a state of the time-based event in the lead calendar,
   wherein the state of the time-based event identifies whether there has been a user response to the time-based event, and if so, an indication of the user's response,
   wherein selecting the lead calendar includes:
      determining that none of the plurality of calendars associated with the time-based event is a primary calendar specific to the user;
      responsive to determining that the user has edit rights for one calendar of the plurality of calendars associated with the time-based event, selecting the one calendar as the lead calendar;

responsive to determining that the user has edit rights for two or more calendars of the plurality of calendars associated with the time-based event, selecting a lead calendar from the two or more calendars according to a calendar type of each of the two or more calendars and a name associated with each of the two or more calendars; and responsive to determining that the user has edit rights for none of the plurality of calendars associated with the time-based event, selecting a lead calendar from the plurality of calendars according to a calendar type of each of the plurality of calendars and a name associated with each of the plurality of calendars, and wherein the calendar type is one of a calendar associated with a specific user and a calendar associated with a non-specific user or a group of users.

9. The system of claim 8, wherein the event chip includes a plurality of colors, each of the plurality of colors corresponding to a different one of the plurality of calendars associated with the time-based event.

10. The system of claim 8, wherein the event chip includes a first color corresponding to the lead calendar and one or more other colors corresponding to one or more other calendars of the plurality of calendars, the first color being different from the one or more other colors.

11. The system of claim 8, wherein the one or more processors are caused to perform further operations comprising:

in response to detecting user interaction with the event chip, displaying additional data about the time-based event in the lead calendar.

12. The system of claim 8, wherein the one or more processors are caused to perform further operations comprising:

in response to detecting user interaction with the event chip, expanding the event chip into a plurality of different chips corresponding to the plurality of calendars associated with the time-based event.

13. The system of claim 8, wherein the data associated with the lead calendar includes data about a state of the time-based event in the lead calendar.

14. The system of claim 8, wherein the lead calendar corresponds to a primary calendar associated with only the user.

15. One or more non-transitory computer readable media storing computer-executable instructions that, when executed by one or more processors, causes the one or more processors to perform operations comprising:

determining that a time-based event is associated with a plurality of calendars being viewed together by a user;

selecting a lead calendar from the plurality of calendars associated with the time-based event based on a determination as to whether one of the plurality of calendars being viewed together by the user is a primary calendar specific to the user, where a primary calendar is a calendar associated with a particular user;

generating an event chip for the time-based event based on data associated with the lead calendar; and displaying the event chip in the plurality of calendars being viewed together by the user, wherein the event chip includes an indication that the time-based event is associated with the plurality of calendars and also an indication of a state of the time-based event in the lead calendar, wherein the event chip includes a plurality of colors, each of the plurality of colors corresponding to a different one of the plurality of calendars associated with the time-based event, wherein the state of the time-based event identifies whether there has been a user response to the time-based event, and if so, an indication of the user's response, wherein selecting the lead calendar includes:

determining that none of the plurality of calendars associated with the time-based event is a primary calendar specific to the user;

responsive to determining that the user has edit rights for one calendar of the plurality of calendars associated with the time-based event, selecting the one calendar as the lead calendar;

responsive to determining that the user has edit rights for two or more calendars of the plurality of calendars associated with the time-based event, selecting a lead calendar from the two or more calendars according to a calendar type of each of the two or more calendars and a name associated with each of the two or more calendars; and responsive to determining that the user has edit rights for none of the plurality of calendars associated with the time-based event, selecting a lead calendar from the plurality of calendars according to a calendar type of each of the plurality of calendars and a name associated with each of the plurality of calendars, and wherein the calendar type is one of a calendar associated with a specific user and a calendar associated with a non-specific user or a group of users.

* * * * *